United States Patent
Eide et al.

(10) Patent No.: US 7,490,042 B2
(45) Date of Patent: Feb. 10, 2009

(54) METHODS AND APPARATUS FOR ADAPTING OUTPUT SPEECH IN ACCORDANCE WITH CONTEXT OF COMMUNICATION

(75) Inventors: Ellen Marie Eide, Tarrytown, NY (US); Wael Mohamed Hamza, Yorktown Heights, NY (US); Michael Alan Picheny, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 11/092,057

(22) Filed: Mar. 29, 2005

(65) Prior Publication Data

US 2006/0229873 A1   Oct. 12, 2006

(51) Int. Cl.
*G10L 15/00* (2006.01)

(52) U.S. Cl. .................. 704/270; 704/235; 704/257; 704/275; 379/88.04; 715/708

(58) Field of Classification Search .............. 704/235, 704/257, 270, 275; 379/88.04; 715/708
See application file for complete search history.

(56) References Cited

U.S. PATENT DOCUMENTS

| | | | |
|---|---|---|---|
| 5,615,296 A * | 3/1997 | Stanford et al. ......... 704/270.1 |
| 6,246,981 B1 * | 6/2001 | Papineni et al. ............. 704/235 |
| 7,137,126 B1 * | 11/2006 | Coffman et al. ............. 719/328 |
| 7,242,752 B2 * | 7/2007 | Chiu ....................... 379/88.04 |
| 7,324,942 B1 * | 1/2008 | Mahowald et al. .......... 704/270 |
| 2003/0167167 A1 * | 9/2003 | Gong ........................ 704/250 |
| 2004/0006471 A1 * | 1/2004 | Chiu ......................... 704/260 |
| 2007/0043574 A1 * | 2/2007 | Coffman et al. ............. 704/275 |

\* cited by examiner

*Primary Examiner*—Daniel D Abebe
(74) *Attorney, Agent, or Firm*—Anne V. Dougherty; Ryan, Mason & Lewis, LLP

(57) ABSTRACT

A technique for producing speech output in an automatic dialog system in accordance with a detected context is provided. Communication is received from a user at the automatic dialog system. A context of the communication from the user is detected in a context detector of the automatic dialog system. A message is created in a natural language generator of the automatic dialog system in communication with the context detector. The message is conveyed to the user through a speech synthesis system of the automatic dialog system, in communication with the natural language generator and the context detector. Responsive to a detected level of ambient noise, the context detector provides at least one command in a markup language to cause the natural language generator to create the message using maximally intelligible words and to cause the speech synthesis system to convey the message with increased volume and decreased speed.

10 Claims, 3 Drawing Sheets

METHODS AND APPARATUS FOR ADAPTING OUTPUT SPEECH IN ACCORDANCE WITH CONTEXT OF COMMUNICATION

CROSS REFERENCE TO RELATED APPLICATIONS

This application is related to U.S. patent application Ser. No. 11/092,008, entitled "Methods and Apparatus for Conveying Synthetic Speech Style from a Text-to-Speech System," which is filed concurrently herewith and incorporated by reference herein.

FIELD OF THE INVENTION

The present invention relates to automatic dialog systems and, more specifically, to methods and apparatus for determining a context of speech incoming to an automatic dialog system and modifying outgoing speech accordingly.

BACKGROUND OF THE INVENTION

In telephony applications, text-to-speech (TTS) systems may be utilized in the production of speech output as part of an automatic dialog system. Typically during a call session, automatic dialog systems first transcribe the words communicated by a caller through a speech recognition engine. A natural language understanding (NLU) unit in communication with the speech recognition engine is used to uncover the meanings of the caller's words. These meanings may then be interpreted to determine requested information, which may be retrieved from a database by a dialog manager. The retrieved information is passed to a natural language generation (NLG) block, which forms a sentence in response to the caller. The sentence is then output, or spoken, to the caller through a speech synthesis system.

A TTS system may be utilized in many current real world applications as a part of an automatic dialog system. For example, a caller to an air travel system may communicate with a TTS system to receive air travel information, such as reservations, confirmations, schedules, etc., in the form of TTS generated speech.

A well known phenomenon in human-to-human communication is the "Lombard effect," in which a speaker will increase his volume and articulate more carefully when the conversation is taking place in a noisy environment, in order to increase the amount of information received by the listener. In contrast, automatic dialog systems produce or output speech in the same manner for a given text, independent of an ambient noise level.

Therefore, it is desirable for an automatic dialog system to act similar to a human speaker and adjust characteristics of the outgoing speech, for example, through increased volume and careful articulation, according to the environment or context of the incoming communication. Contextual variables such as the time of day, the date, characteristics of the listener, the location where the speech is to be heard, etc., may assist in shaping desired characteristics of the speech produced by a TTS engine of an automatic dialog system. Currently, a dialog system does not exist having the ability, or sophistication, to adapt its output in accordance with the context in which communication is taking place.

SUMMARY OF THE INVENTION

The present invention provides techniques for determining the context of incoming speech in an automatic dialog system and adjusting outgoing speech accordingly so that the amount of information received by a user is increased.

For example, in one aspect of the invention, a technique for producing speech output in an automatic dialog system in accordance with a detected context is provided. Communication is received from a user at the automatic dialog system. A context of the communication from the user is detected in a context detector of the automatic dialog system. The context of the communication comprises an ambient noise level. A message is created in a natural language generator of the automatic dialog system in communication with the context detector. The message is conveyed to the user through a speech synthesis system of the automatic dialog system, in communication with the natural language generator and the context detector. Responsive to a detected level of ambient noise, the context detector provides at least one command in a markup language to cause the natural language generator to create the message using maximally intelligible words and to cause the speech synthesis system to convey the message with increased volume and decreased speed.

In an additional aspect of the invention, an automatic dialog system for producing speech output in accordance with a detected context is provided. The automatic dialog system comprises a context detector for detecting the context of a communication received from a user of the automatic dialog system, a natural language generator in communication with the context detector that creates the message, and a speech synthesis system in communication with the natural language generator and the context detector, that conveys the message to the user. The context of the communication comprises an ambient noise level. Responsive to a detected level of ambient noise, the context detector provides at least one command in a markup language to cause the natural language generator to create the message using maximally intelligible words and to cause the speech synthesis system to convey the message with increased volume and decreased speed.

Advantageously, the present invention produces output speech from an automatic dialog system in accordance with a detected context of the communication so that the output text and manner of speaking are capable of being modified, thereby increasing the amount of information received by a user.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

As will be illustrated in detail below, the present invention introduces techniques for modifying the output speech of an automatic dialog system in accordance with the detected context of incoming speech, by conveying the appropriate information from a context detector to a natural language generator and speech synthesis system of the automatic dialog system.

Figure 1:
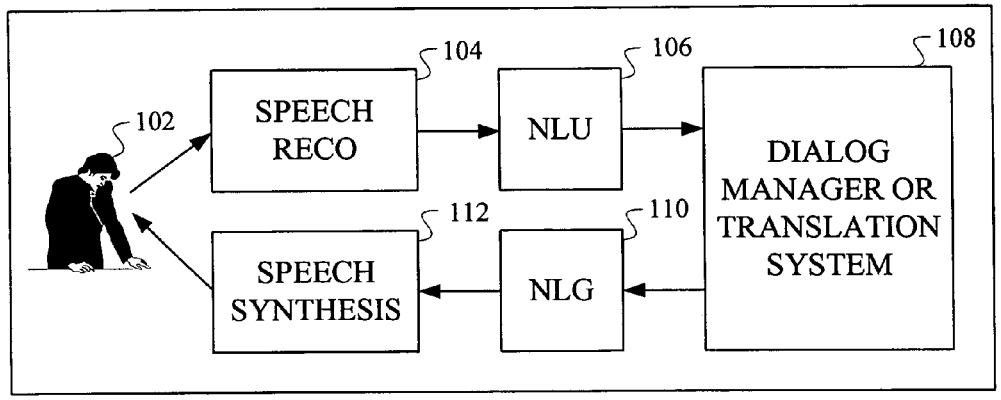
FIG. 1 is a detailed block diagram illustrating a text-to-speech system utilized in an automatic dialog system, according to an embodiment of the present invention.

Referring initially to FIG. 1, a detailed block diagram illustrates a text-to-speech (TTS) system utilized in an automatic dialog system, according to an embodiment of the present invention. A caller 102 initiates communication with the automatic dialog system, through a spoken message or request. A speech recognition engine 104 receives the sounds sent by caller 102 and associates them with words, thereby recognizing the speech of caller 102. The words are sent from speech recognition engine 104 to a natural language understanding (NLU) unit 106, which determines the meanings behind the words of caller 102. These meanings are used to determine what information is desired by caller 102. A dialog manager 108 in communication with NLU unit 106 retrieves the information requested by caller 102 from a database. Dialog manager 106 may also be implemented as a translation system.

The retrieved information is sent from dialog manager 108 to a natural language generation (NLG) block 110, which forms a message in response to communication from caller 102, having the requested information. Once the sentence is formed, a speech synthesis system 112, plays, outputs, or speaks the sentence to the caller with the requested information. NLG block 110 and speech synthesis system 112 may be considered the TTS system of the automatic dialog system. It is also in NLG block 110 and speech synthesis system 112 where the present invention is implemented through, for example, the modification of words chosen in NLG block 110 and the adjustment of volume and articulation of output speech in speech synthesis system 112, in accordance with the detected context of communication received from caller 102.

Figure 2:
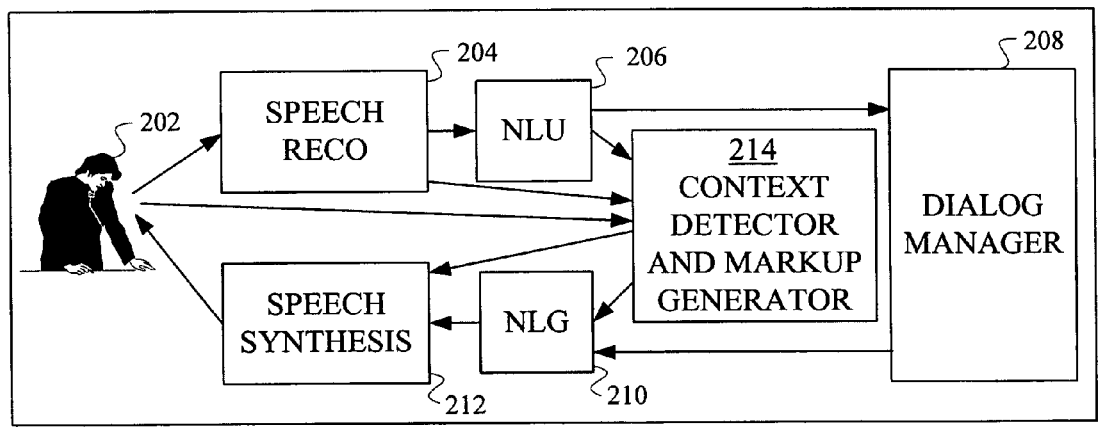
FIG. 2 is a detailed block diagram illustrating a text-to-speech system utilized in another automatic dialog system, according to an embodiment of the present invention.

Referring now to FIG. 2, a detailed block diagram illustrates a TTS system utilized in another automatic dialog system, according to an embodiment of the present invention. A caller 202, a speech recognition engine 204, a natural language understanding (NLU) unit 206, a dialog manager 208, a natural language generation (NLG) block 210 and a speech synthesis system 212 operate in similar manners to those described above with regard to their respective counterparts in FIG. 1.

The automatic dialog system provided in the embodiment of the invention shown in FIG. 2 also includes a context detector 214. Context detector 214 is shown in communication with caller 202, speech recognition engine 204 and NLU unit 206. This communication enables context detector 214 to receive the sounds, words and meanings of the communication so that a context of the incoming communication may be determined. The context of the incoming communication may include, but is not limited to the ambient noise level, the age and gender of caller 202, the location of caller 202, the time and date of the call, and the emotional state of caller 202.

Context detector 214 is also in communication with NLG block 210 and speech synthesis engine 212. This communication enables context detector 214 to modify an outgoing message in accordance with any detected context of the communication. For example, as described above, context detector 214 may modify or substitute words chosen in NLG block 210 for the output speech through a markup language generated in context detector 214. Speech components such as, for example, volume and articulation may also be adjusted in speech synthesis system 212 in accordance with a detected context of the incoming communication.

Figure 3:
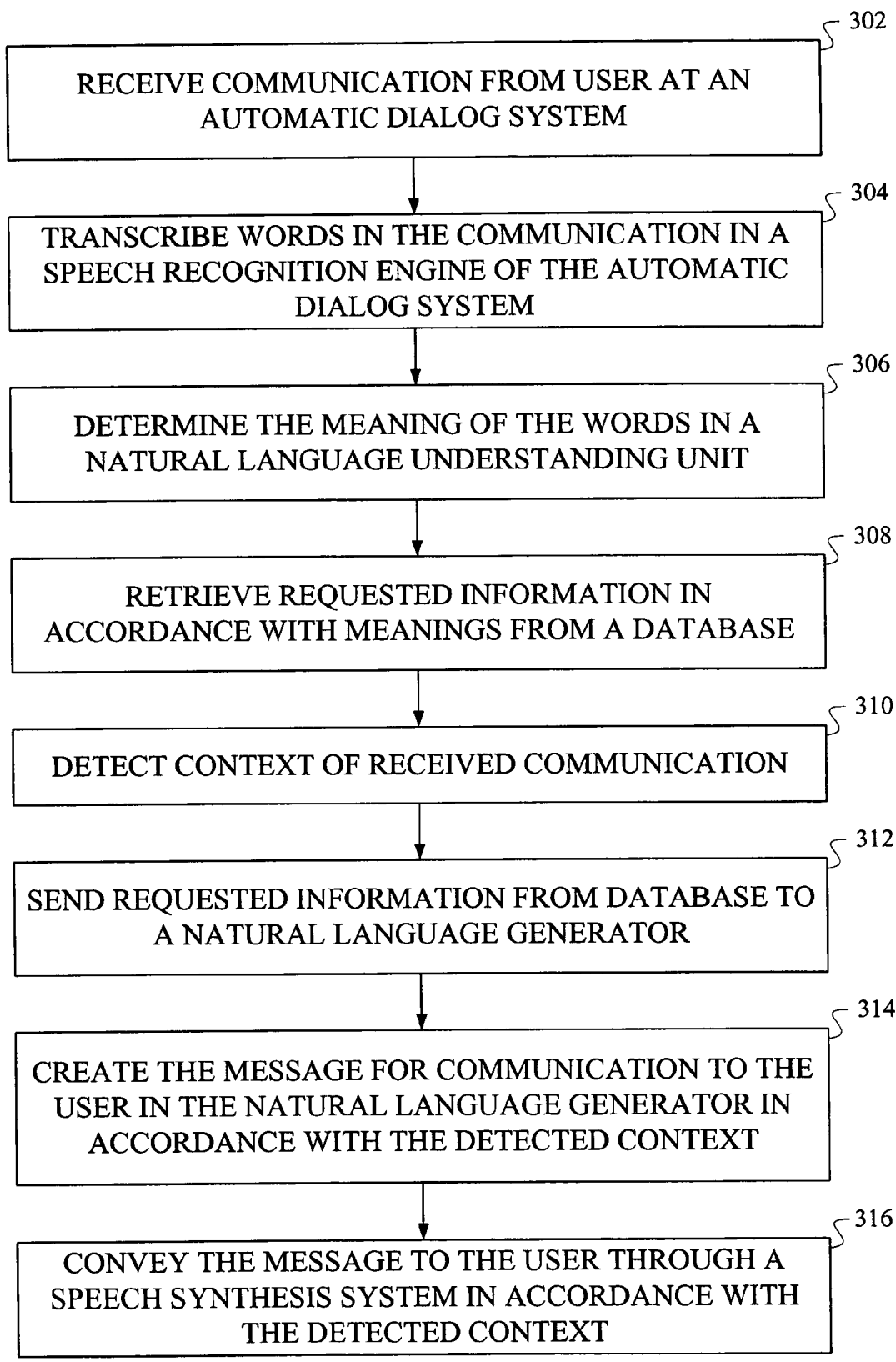
FIG. 3 is a flow diagram illustrating a speech output production methodology in an automatic dialog system, according to an embodiment of the present invention.

Referring now to FIG. 3, a flow diagram illustrates a speech output production methodology in an automatic dialog system, according to an embodiment of the present invention. In block 302, an incoming communication is received from a user at an automatic dialog system. Typically a user of an automatic dialog system is a caller attempting to obtain specific information. In block 304, words in the communication from the user to the automatic dialog system are transcribed in a speech recognition engine of the automatic dialog system. In block 306, the meaning of these words are determined through a natural language understanding unit in communication with the speech recognition engine in the automatic dialog system. In block 308, information is retrieved from a database in accordance with the meaning of the words. The information is typically that which is sought by the user or caller to the automatic dialog system. The database is in communication with the natural language understanding unit in the automatic dialog system.

In block 310, the context the communication from a user to the automatic dialog system is detected in a context detector of the automatic dialog system. The context detector is in communication with the user, the speech recognition engine and the natural language understanding unit so that the context detector may analyze sounds, word choice, word meaning and purpose in determining the context of the communication. As described above, the context of the communication may include but is not limited to the ambient noise level, the age and gender of the caller, the location of the caller, the time and date of the call, and the emotional state of the caller. In block 312, the requested information is sent from the database to a natural language generator.

In block 314, a message containing the requested information is created in the natural language generator for communication to the caller. The natural language generator is also in communication with the context detector. The creation of the message in the natural language generator may be affected by the context detector. The context detector may, for example, influence the word choice in the composition of the message depending on the context of the communication. This control over the natural language generator is enabled by the sending of a command in a markup language from the context detector to the natural language generator.

In block 316, the message is conveyed to the user through a speech synthesis system that is in communication with the natural language generator. The speech synthesis system is also in communication with the context detector, so that the context detector may affect the speech synthesis of the message. The context detector may adjust the volume, pronunciation, or articulation of the message depending on the determined context of the communication. The context detector may affect one or both of the natural language generator and the speech synthesis system, depending on the detected context of the communication from the user.

Returning now to the "Lombard" example presented above, if the context detector determines that the caller is in a noisy location, it could, using markup, inform the NLG system to use maximally intelligible words for easier understanding by the caller. For example, the context detector may program the NLG system to use "negative" rather than "no," since "negative" would be less confusable with other words. The context detector may also inform the speech synthesis system to adjust the volume and articulation of the engine to speak louder and slower than normal. As another example, the language style of the automatic dialog system could be adapted to fit that of the caller. For example, a caller from the southern part of the United States could be responded to in a southern accent. Further, if the context detector estimated the emotional state of the caller to be angry, the output speech could be rendered in a soothing or understanding tone as an attempt at appeasement.

While the example has illustrated a telephone-based system, the invention is easily applied in other scenarios such as kiosks and Internet-based applications. Additional embodiments of the present invention may include different automatic dialog system and TTS system components and configurations. The invention may be implemented in any system in which it is desirable to adapt output speech in accordance with the context of the communication.

Figure 4:
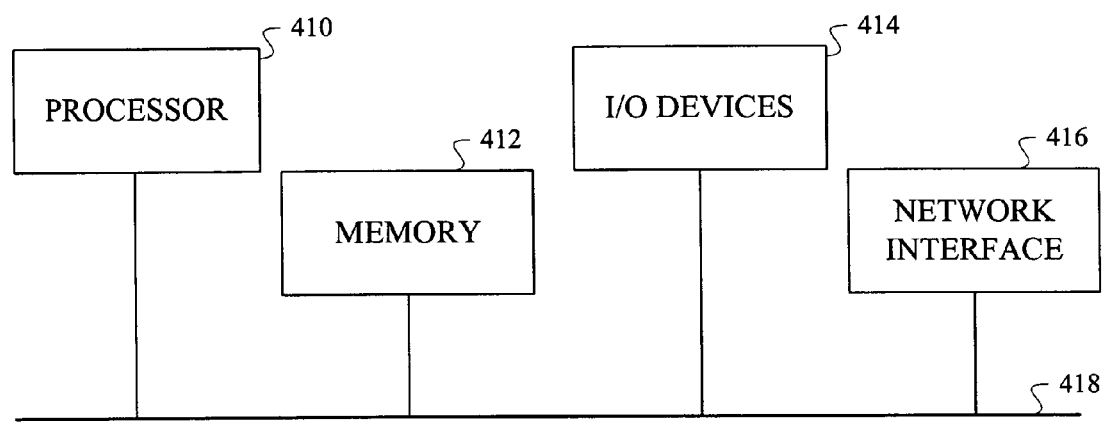
FIG. 4 is a block diagram illustrating a hardware implementation of a computing system in accordance with which one or more components/methodologies of the invention may be implemented, according to an embodiment of the present invention.

Referring now to FIG. 4, a block diagram illustrates an illustrative hardware implementation of a computing system in accordance with which one or more components/methodologies of the invention (e.g., components/methodologies described in the context of FIGS. 1-3) may be implemented, according to an embodiment of the present invention. For instance, such a computing system in FIG. 4 may implement the automatic dialog system and the executing program of FIGS. 1-3.

As shown, the computer system may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices for entering speech or text into the processing unit, and/or one or more output devices for outputting speech associated with the processing unit. The user input speech and the TTS system annotated output speech may be provided in accordance with one or more of the I/O devices.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of producing speech output in an automatic dialog system in accordance with a detected context, the method comprising the steps of:
   receiving a communication from a user at the automatic dialog system;
   detecting a context of the communication from the user in a context detector of the automatic dialog system, the context of the communication comprising an ambient noise level;
   creating a message in a natural language generator of the automatic dialog system in communication with the context detector; and
   conveying the message to the user through a speech synthesis system of the automatic dialog system, in communication with the natural language generator and the context detector; and
   wherein, responsive to a detected level of ambient noise, the context detector provides at least one command in a markup language to cause the natural language generator to create the message using maximally intelligible words and to cause the speech synthesis system to convey the message with increased volume and decreased speed.

2. The method of claim 1, wherein the step of conveying the message to the user comprises the step of modifying articulation and pronunciation of the message to adapt the message in accordance with the detected context of the communication.

3. The method of claim 1, wherein the step of receiving a communication comprises the steps of:
   transcribing words in the communication from the user in a speech recognition engine of the automatic dialog system;
   determining the meaning of the words through a natural language understanding unit in communication with the speech recognition engine and the context detector in the automatic dialog system;
   retrieving requested information in accordance with the meaning of the words, from a database in communication with the natural language understanding unit in the automatic dialog system; and
   sending the requested information from the database to the text-to-speech system.

4. The method of claim 1, wherein the context of the communication further comprises at least one of an, an age of the user, a gender of the user, a location of user, a time of the communication, a date of the communication, and an emotional state of the user.

5. The method of claim 1, wherein the step of detecting a context of the communication comprises the steps of:
   analyzing sound, words and meaning in the communication; and
   determining the context of the communication based on the analysis.

6. An automatic dialog system for producing speech output in accordance with a detected context, comprising:
   a context detector for detecting the context of a communication received from a user of the automatic dialog system, the context of the communication comprising an ambient noise level;
   a natural language generator in communication with the context detector that creates the message; and a speech synthesis system in communication with the natural language generator and the context detector, that conveys the message to the user;

wherein, responsive to a detected level of ambient noise, the context detector provides at least one command in a markup language to cause the natural language generator to create the message using maximally intelligible words and to cause the speech synthesis system to convey the message with increased volume and decreased speed.

7. The automatic dialog system of claim 6, wherein articulation and pronunciation is modified to adapt the message in accordance with the detected context of the communication.

8. The automatic dialog system of claim 6, further comprising:

a speech recognition engine that transcribes words in the communication from the user;

a natural language understanding unit in communication with the speech recognition engine and the context detector that determines the meaning of the words; and a dialog manager in communication with the natural language understanding unit and the text-to-speech system that retrieves requested information from a database in accordance with the meaning of the words.

9. The automatic dialog system of claim 6, wherein the context of the communication further comprises at least one of an age of the user, a gender of the user, a location of user, a time of the communication, a date of the communication, and an emotional state of the user.

10. The automatic dialog system of claim 6, wherein the context detector analyzes noise, words and meaning in the communication and determines the context of the communication based on the analysis.

* * * * *